(12) United States Patent
Kodama

(10) Patent No.: US 11,583,467 B2
(45) Date of Patent: Feb. 21, 2023

(54) CHAIR-TYPE MASSAGE MACHINE

(71) Applicant: Fuji Medical Instruments Mfg. Co., Ltd., Osaka (JP)

(72) Inventor: Shogo Kodama, Osaka (JP)

(73) Assignee: Fuji Medical Instruments Mfg. Co., Ltd., Osaka (JP)

( * ) Notice: Subject to any disclaimer, the term of this patent is extended or adjusted under 35 U.S.C. 154(b) by 479 days.

(21) Appl. No.: 16/801,317

(22) Filed: Feb. 26, 2020

(65) Prior Publication Data

US 2020/0405569 A1 Dec. 31, 2020

(30) Foreign Application Priority Data

Jun. 28, 2019 (JP) .............................. JP2019-121108

(51) Int. Cl.
  *A47C 7/62* (2006.01)
  *A61H 7/00* (2006.01)
  *A47C 1/022* (2006.01)
  *A47C 31/00* (2006.01)
  *G06F 3/0482* (2013.01)

(52) U.S. Cl.
  CPC .............. *A61H 7/00* (2013.01); *A47C 1/022* (2013.01); *A47C 31/008* (2013.01); *G06F 3/0482* (2013.01); *A61H 2201/0149* (2013.01); *A61H 2201/0161* (2013.01); *A61H 2201/5028* (2013.01)

(58) Field of Classification Search
  CPC .......... A47C 31/008; A61H 2201/0149; G06F 3/0482
  USPC ...................... 297/188.16, 145, 217.3–217.5
  See application file for complete search history.

(56) References Cited

U.S. PATENT DOCUMENTS

| | | | | | |
|---|---|---|---|---|---|
| 4,576,149 A | * | 3/1986 | Otuka | ..................... | A61H 15/00 601/99 |
| 4,759,584 A | * | 7/1988 | Dykstra | ................. | B60N 3/102 297/188.16 |
| 5,076,524 A | * | 12/1991 | Reh | .......................... | B60N 2/79 297/217.3 X |
| 5,195,709 A | * | 3/1993 | Yasushi | .............. | B64D 11/0646 297/217.3 X |
| 5,374,104 A | * | 12/1994 | Moore | ............. | B64D 11/00153 297/188.16 X |
| 6,007,036 A | * | 12/1999 | Rosen | ................. | B64D 11/0627 297/217.3 |
| 6,039,702 A | * | 3/2000 | Cutler | ................ | A61H 23/0263 601/57 |
| 6,117,094 A | * | 9/2000 | Fujii | ...................... | A61H 39/04 601/102 |

(Continued)

FOREIGN PATENT DOCUMENTS

JP 2017-140275 A 8/2017

*Primary Examiner* — Rodney B White
(74) *Attorney, Agent, or Firm* — Masuvalley & Partners; Peter R. Martinez

(57) ABSTRACT

A chair-type massage machine includes a main body on which a person to be treated is to be seated, a holding part at least part of which is placed inside a container recess to hold a first operation unit, and a moving mechanism for moving the holding part. The holding part is reciprocatably moved between a first position in which the first operation unit is contained in the container recess and a second position in which the first operation unit is exposed. The chair-type massage machine further includes a second operation unit for moving the holding part.

5 Claims, 10 Drawing Sheets

(56) References Cited

U.S. PATENT DOCUMENTS

| | | | | |
|---|---|---|---|---|
| 6,171,266 B1* | 1/2001 | Inada | | A61H 23/00 601/102 |
| 6,517,500 B2* | 2/2003 | Ichikawa | | A61H 9/0078 601/97 |
| 6,592,533 B1* | 7/2003 | Yonekawa | | A47C 4/54 601/49 |
| 7,189,211 B2* | 3/2007 | Inada | | A61H 23/0254 601/99 |
| 7,195,604 B2* | 3/2007 | Nakamura | | A61H 23/04 601/149 |
| 7,241,271 B2* | 7/2007 | Kurata | | A61H 1/0266 601/34 |
| 7,261,266 B2* | 8/2007 | Satterfield | | B64D 11/00153 297/217.3 |
| 7,293,839 B2* | 11/2007 | Shimizu | | A61H 7/004 297/423.35 |
| 8,083,700 B2* | 12/2011 | Tanizawa | | A61H 23/04 601/151 |
| 8,827,938 B2* | 9/2014 | Fukuyama | | A47C 3/02 601/102 |
| 9,377,870 B2* | 6/2016 | Kim | | G06F 3/0236 |
| 9,715,822 B2* | 7/2017 | Hille | | A47C 20/041 |
| 9,813,239 B2* | 11/2017 | Chee | | G16H 20/30 |
| 10,663,730 B2* | 5/2020 | Jung | | G16H 30/20 |
| 10,966,901 B2* | 4/2021 | Masuda | | G06F 1/163 |
| 11,103,673 B2* | 8/2021 | Bae | | A61H 15/00 |
| 11,278,466 B2* | 3/2022 | Yoshida | | A61H 7/007 |
| 2007/0273180 A1* | 11/2007 | Tanizawa | | A61H 1/0274 297/85 M |
| 2007/0273187 A1* | 11/2007 | Tanizawa | | A61H 15/0078 297/217.3 |
| 2008/0030053 A1* | 2/2008 | Kamba | | A61H 1/003 297/217.3 X |
| 2008/0185888 A1* | 8/2008 | Beall | | A47C 7/723 297/217.3 X |
| 2010/0320819 A1* | 12/2010 | Cohen | | A61H 23/0236 297/217.3 X |
| 2011/0077563 A1* | 3/2011 | Fukuyama | | A47C 3/02 601/98 |
| 2013/0088059 A1* | 4/2013 | Nagamitsu | | A61H 1/003 297/260.1 |
| 2016/0113835 A1* | 4/2016 | Tan | | A61H 23/006 601/116 |
| 2016/0374885 A1* | 12/2016 | Tan | | A61H 1/008 601/134 |
| 2019/0183722 A1* | 6/2019 | Le | | A47C 1/00 |
| 2019/0290533 A1* | 9/2019 | Le | | A47C 1/00 |
| 2020/0197255 A1* | 6/2020 | Bae | | A47C 31/126 |
| 2020/0281359 A1* | 9/2020 | Fukunaga | | A47C 31/008 |
| 2020/0397644 A1* | 12/2020 | Jung | | A61H 1/00 |
| 2022/0183922 A1* | 6/2022 | Le | | A61H 39/08 |

\* cited by examiner

CHAIR-TYPE MASSAGE MACHINE

RELATED APPLICATIONS

This application is based upon and claims the benefit of priority from the corresponding Japanese Patent Application No. 2019-121108 (filed on Jun. 28, 2019), the contents of which are incorporated herein by reference.

BACKGROUND OF THE INVENTION

Field of the Invention

The present invention relates to a chair-type massage machine capable of containing an operation unit.

Description of Related Art

JP 2017-140275 A discloses a chair-type massage machine which includes a pocket part capable of containing a remote control unit.

The chair-type massage machine described in JP 2017-140275 A, having a structure capable of containing a remote control unit, requires a person to be treated to grasp and draw out the remote control unit from the pocket part on occasions of use of the remote control unit. Thus, taking out the remote control unit is burdensome for the user.

SUMMARY OF THE INVENTION

Accordingly, an object of the present invention is to provide a chair-type massage machine including an operation unit which, while out of use, is less obstructive for a person to be treated and which can be easily taken out on occasions of its use.

In order to achieve the above object, the present invention provides a chair-type massage machine including: a main body on which a person to be treated is to be seated; a first operation unit for accepting an input operation made by the person to be treated; a container recess formed in the main body and capable of containing the first operation unit; a holding part at least part of which is placed inside the container recess to hold the first operation unit; and a moving mechanism for moving the holding part. The holding part is reciprocatably movable between a first position in which at least part of the first operation unit is contained inside the container recess and a second position in which the first operation unit is exposed out of the container recess at a ratio larger than that of the first position. The chair-type massage machine further includes a second operation unit which is placed on the main body and which, based on an operation by the person to be treated, instructs the moving mechanism to execute movement of the holding part.

DESCRIPTION OF EMBODIMENTS

Figure 1:
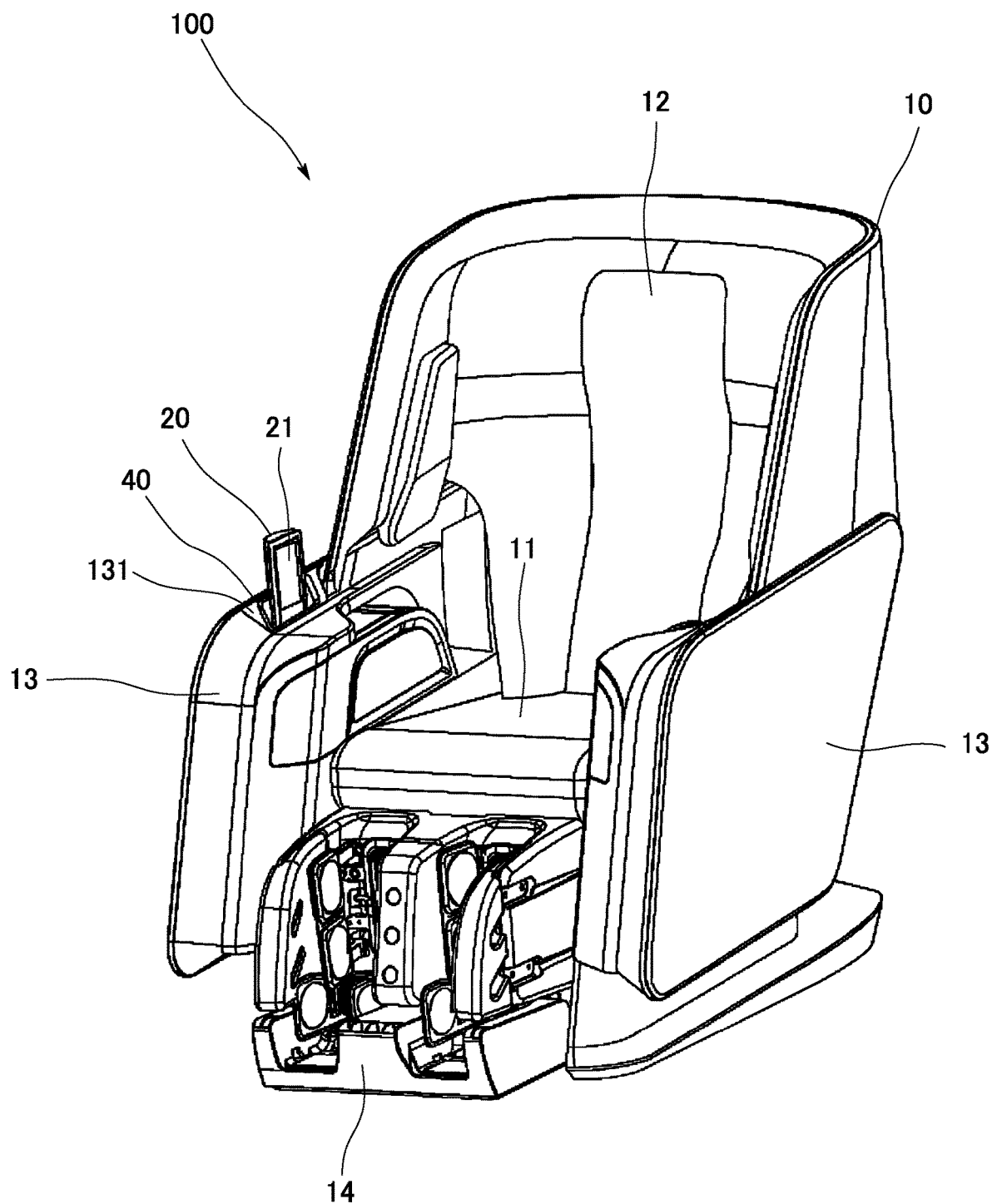
FIG. 1 is a perspective view of a chair-type massage machine according to the present invention.
Figure 2:
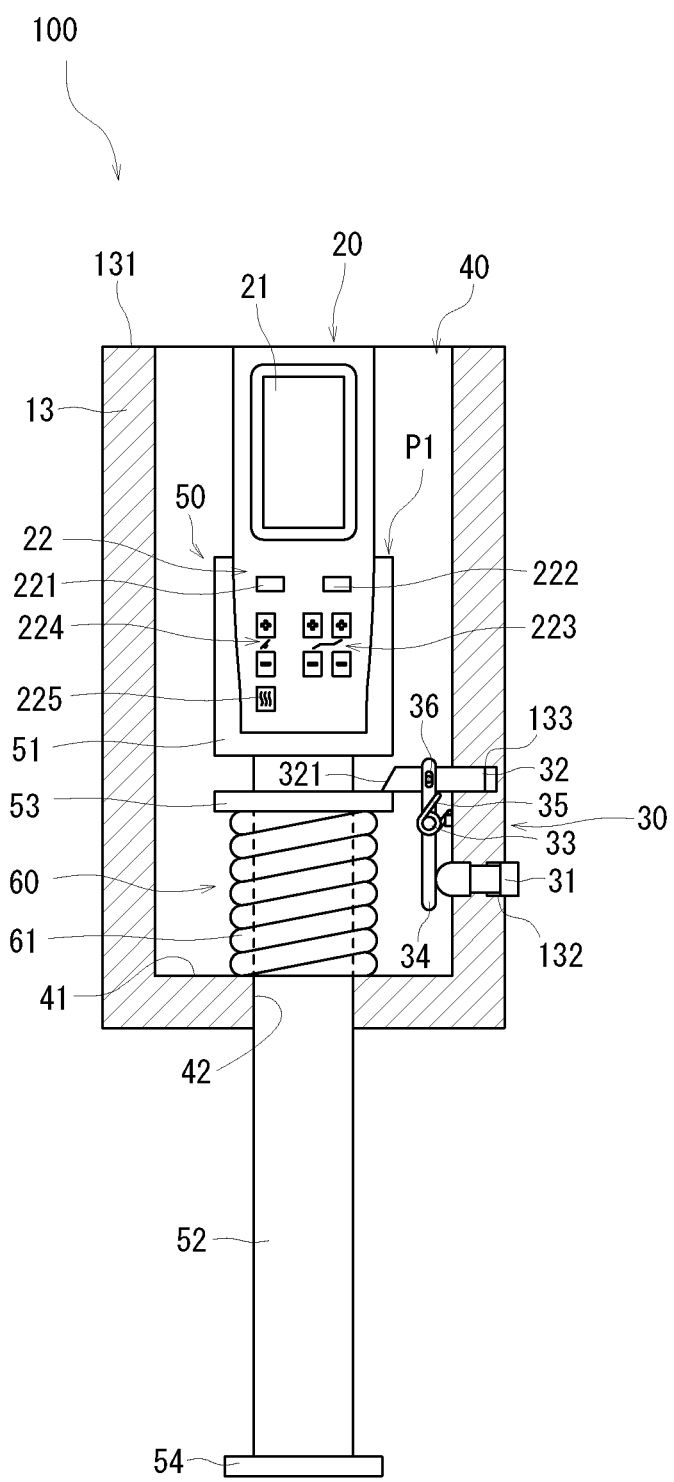
FIG. 2 is a schematic sectional view showing a state in which a first operation unit is contained in a container recess.
Figure 3:
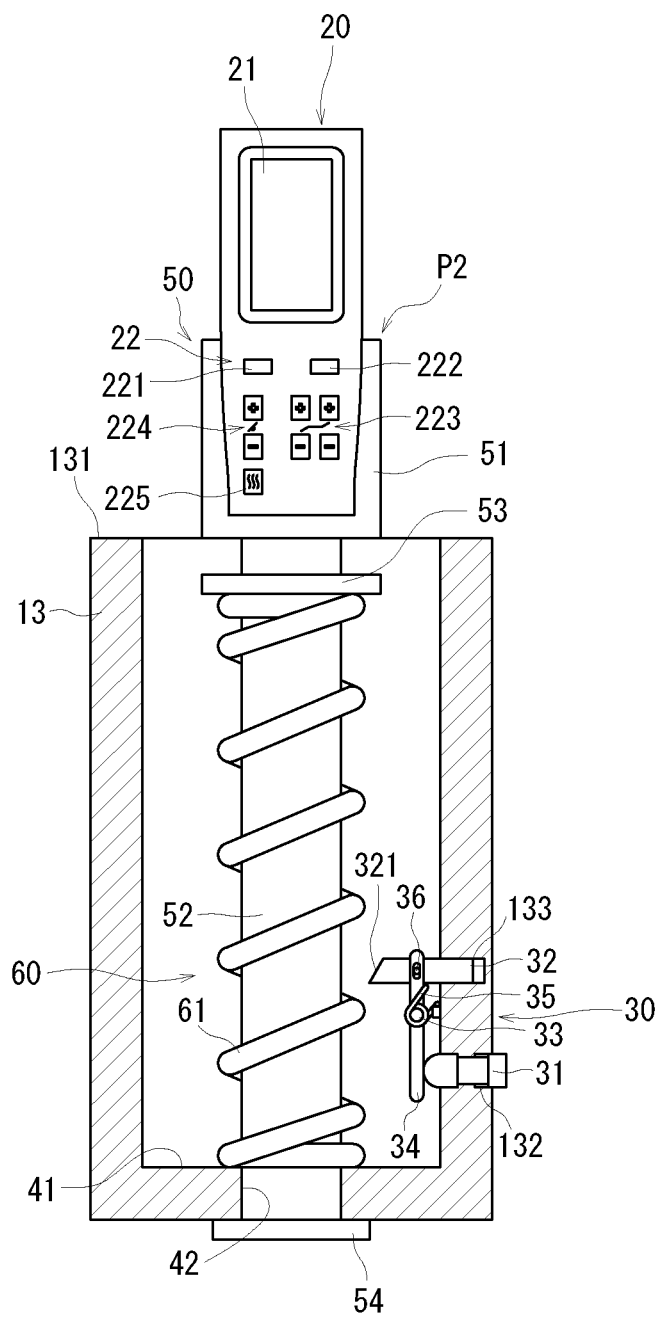
FIG. 3 is a schematic sectional view showing a state in which the first operation unit is exposed outside from the container recess.

Hereinbelow, embodiments of the present invention will be described with reference to the accompanying drawings. FIG. 1 is a perspective view of a chair-type massage machine 100 according to the present invention. FIG. 2 is a schematic sectional view showing a state in which a first operation unit 20 is contained in a container recess 40. FIG. 3 is a schematic sectional view showing a state in which the first operation unit 20 is exposed outside from the container recess 40. Although the first operation unit 20 is oriented frontward in FIGS. 2 and 3, yet this orientation is for an easier explanation and may be other than actual ones.

In the following description, positions and directions of the chair-type massage machine 100 and its configurational components may be indicated by 'left,' 'right,' 'up' and 'down.' These indications are on a basis of the chair-type massage machine 100 shown in FIG. 1. Moreover, these directions are congruous with directions viewed from the person to be treated seated on the chair-type massage machine 100.

<Chair-Type Massage Machine 100>

The chair-type massage machine 100 is to massage and relax (hereinafter, this operation will be referred to as treatment) the whole body of a person to be treated held on the massage machine. As shown in FIGS. 1 to 3, the chair-type massage machine 100 includes a main body 10, a first operation unit 20, a second operation unit 30, a container recess 40, a holding part 50, and a moving mechanism 60. In addition, an unshown cover is attached to the chair-type massage machine 100.

<Main Body 10>

The person to be treated is seated on the main body 10. The main body 10 includes a seat part 11, a backrest part 12, armrest parts 13, and a leg and foot treatment part 14. The seat part 11 holds buttocks and thighs of the person to be treated. The seat part 11 may include expansion/contraction portions for treating the buttocks or thighs. Each expansion/contraction portion includes, for example, a bag member (so-called air bag) which is enabled to repeat expansion and contraction by charging and discharging air. Hereinbelow, expansion/contraction portions to be used have a similar structure.

The backrest part 12 is placed in a rear of the seat part 11 and erectly provided upward of the seat part 11. As will be detailed later, the backrest part 12 includes a so-called reclining mechanism 101 having a function of tilting its upper portion rearward relative to the seat part 11. In addition, the reclining mechanism 101 includes a motor (not shown) for driving the backrest part 12.

The backrest part 12 includes a back treatment portion (not shown) for, while moving in the longitudinal direction, massaging the back of the person to be treated. The backrest part 12 may also include expansion/contraction portions for massaging shoulders and side part of upper-arm of the person to be treated held by the backrest part 12.

The armrest parts 13 allow arms of the person to be treated seated on the seat part 11 to be rested thereon. The armrest parts 13 are placed so as to be paired on the left and right of the seat part 11. The armrest parts 13 may include arm treatment portions for massaging the arms, i.e. forearms, wrists and fingers, of the person to be treated. Also, a container recess 40 in which the first operation unit 20 is contained is formed in an upper face 131 of one armrest part 13. Details of the container recess 40 will be described later.

The leg and foot treatment part 14 is placed in front of the seat part 11 and vertically provided downward of the seat part 11. The leg and foot treatment part 14 is so made up that lower end-side part of the leg and foot treatment part 14 is pivotable about an upper end of the leg and foot treatment part 14 serving as a fulcrum. The leg and foot treatment part 14 has an expansion/contraction portion for massaging both left-and-right calves and foot portions. Also, the leg and foot treatment part 14 may include a treatment portion (not shown) which turns in contact with soles to massage the soles. In addition, the leg and foot treatment part 14 may be such that lower end-side part is pivoted upward in linkage with the reclining mechanism of the backrest part 12.

The chair-type massage machine 100 is enabled to fulfill massage-treatment of the whole body for the person to be treated by each of the treatment portions. Hereinafter, the each of the treatment portions may be referred to comprehensively as massage mechanism. The massage mechanism includes an unshown pump for pressure-feeding compressed air to expansion/contraction portions, an unshown actuator (e.g., motor) for operating the back treatment portion, and the like.

<First Operation Unit 20>

The first operation unit 20 accepts an input operation by the person to be treated. In the chair-type massage machine 100, the first operation unit 20 is a remote control unit. Details of the first operation unit 20 are explained below.

As shown in FIG. 2, the first operation unit 20 includes a display section 21 and an input section 22. The display section 21 is a so-called touch panel-type display including a display panel and a touch sensing panel. The display section 21 displays a menu of plural items. Then, touching a menu item allows an input operation associated with the menu item to be fulfilled. Otherwise, it is also possible to display images (still images, motion images) upon request from the person to be treated.

The input section 22 includes a plurality of hardware buttons, so-called physical keys, that can be depressed by the person to be treated. The physical keys of the input section 22 include a power key 221, an emergency stop key 222, a posture control key 223, a back treatment portion positioning key 224, a heater key 225, and the like.

In the first operation unit 20, for example, setting by the touch panel of the display section 21 is used primarily to make input of settings before treatment, and setting by the input section 22 is used primarily to make control of settings during treatment.

An unshown cable is connected to the first operation unit 20. The first operation unit 20 is supplied with electric power via the cable. Also, the first operation unit 20 transmits signals via the cable to the reclining mechanism, the massage mechanism, and the like. Although the reclining mechanism and the massage mechanism are to be operated directly from the first operation unit 20 in this embodiment, yet this is not limited to. A control unit may be provided independent of the first operation unit 20.

As described above, the first operation unit 20 is used by the person to be treated to make settings of treatment contents before treatment. On the other hand, there is a fear that the first operation unit 20 may be obstructive when the person to be treated is seated on the main body 10 or when the person to be treated leaves the main body 10. For this reason, in the chair-type massage machine 100 according to this embodiment, the first operation unit 20 is to be contained in the container recess 40 while out of use by the person to be treated, i.e., while not needed by the person to be treated.

The container recess 40 is a recessed space which is recessed downward from the upper face 131 of an armrest part 13. The container recess 40 allows the first operation unit 20 to be inserted inside thereof. Besides, the holding part 50 and part of the moving mechanism 60, in addition to the first operation unit 20, are to be inserted into the container recess 40.

The holding part 50 holds the first operation unit 20. The holding part 50 includes a holding frame portion 51 and a guide pole portion 52. The holding frame portion 51 grasps and holds the first operation unit 20. In addition, the first operation unit 20 may be provided separable from the holding frame portion 51 or formed integrally with the holding frame portion 51.

At least part of the holding part 50 is placed inside the container recess 40. The holding part 50 is reciprocatable between a first position P1 (see FIG. 2) in which the first operation unit 20 is contained inside the container recess 40 and a second position (see FIG. 3) in which the first operation unit 20 is exposed.

Although the first position P1 is set to a position in which the first operation unit 20 is fully contained in the container recess 40 in this embodiment, yet this is not limited to. The first position P1 may be such that the first operation unit 20 is protruded from the container recess 40 to such an extent as to be less obstructive when the person to be treated is seated on the seat part 11 or when the person to be treated leaves the seat part 11. Further, although the second position P2 is set to a position in which the first operation unit 20 is fully exposed, yet this is not limited to. The second position P2 needs only to be a position that allows the person to be treated to make input operation, and the first operation unit 20 may be contained only partly inside the container recess 40. That is, the first position P1 is a position in which at least part of the first operation unit 20 is contained inside the container recess 40, and the second position P2 is a position in which the first operation unit 20 is exposed out of the container recess 40 at a ratio larger than that of the first position P1.

The holding frame portion 51 is moved linearly up and down inside the container recess 40. The guide pole portion 52 is a pole-shaped member extending downward from a lower face of the holding frame portion 51. The guide pole portion 52 is inserted into a guide hole 42 formed in a bottom plate portion 41 of the container recess 40. The guide pole portion 52 is movable up and down along the guide hole 42. An anti-leaving portion 54 larger than the guide hole 42 is provided at a lower end of the guide pole portion 52. When the holding part 50 is moved upward, the anti-leaving portion 54 is brought into contact with a marginal edge portion of the guide hole 42, by which the guide pole portion 52 is restricted in movement.

Further, a spring receiver 53 is provided at a site where the guide pole portion 52 connects with the holding frame portion 51, i.e., at a site lower than an upper end of the guide pole portion 52. The spring receiver 53, with which an end of a spring 61 of the moving mechanism 60 is put into contact, is subject to elastic force of the spring 61.

The moving mechanism 60 performs movement of the holding part 50. The moving mechanism 60 is placed inside the container recess 40. The moving mechanism 60 includes the spring 61 as an elastic member. The moving mechanism 60 is not limited to the spring 61 and may be, for example, an air spring or others selected from a wide range of members that can bias the holding part 50 upward. The spring 61 is placed so as to surround the guide pole portion 52. The spring 61 is so placed that its one end is in contact with a bottom plate portion 41 of the container recess 40 while the other end is in contact with the spring receiver 53.

While the holding part 50 is in the first position P1, the spring 61 is compressed so as to be shorter than its equilibrium length. Therefore, while the holding part 50 is in the first position P1, the spring 61 biases the holding part 50 upward with the elastic force. Also while the holding part 50 is in the second position P2, the spring 61 is compressed so as to be shorter than its equilibrium length. As a result, also while being in the second position P2, the holding part 50 is pushed upward with biasing force of the spring 61. By this biasing force, the holding part 50 is stopped at the second position P2. In addition, at least one of the holding part 50, the moving mechanism 60 or the container recess 40 may include a mechanism for restricting downward movement of the holding part 50 being in the second position P2.

The moving mechanism 60 may include deceleration part (not shown) for restricting moving speed of the holding part 50. The deceleration part may be implemented, for example, by using a member which is to be put into contact with the guide pole portion 52 to restrict the moving speed of the holding part 50 by friction, or fitting a damper or other like member which increases in resistance against the speed. Further, instead of providing the deceleration part, the moving speed of the holding part 50 may be adjusted by adjusting the spring constant and equilibrium length of the spring 61.

The moving mechanism 60 is activated based on an operation of the second operation unit 30. An explanation of the second operation unit 30 is given below. As shown in FIGS. 2 and 3, the second operation unit 30 includes a push button 31, a slider lock 32, a pivotal shaft 33, a link portion 34, a torsion spring 35, and a pin 36.

The push button 31 is slidably provided in a button hole 132 which is a through hole formed in a side face on one side of an armrest part 13 closer to the seat part 11. That is, the push button 31 is formed on the seat part 11 side of the armrest part 13, but not limited to this. The push button 31 may be provided on one side of an armrest part 13 opposite to the seat part 11 side, as an example.

The push button 31 is formed into a columnar shape whose axial both ends are larger in diameter than its central portion. As a result, the push button 31 is prevented from leaving the button hole 132 both inward and outward of the container recess 40. Also, the push button 31 is spherical-shaped on one side facing the inside of the container recess 40. Accordingly, every time the push button 31 pushes the link portion 34, it is always part of the sphere which makes contact with the link portion 34, so that stress is less likely to concentrate to a contact spot. In addition, although the push button 31 is formed into a columnar shape in this embodiment, yet this is not limited to. For example, the push button 31 may be formed into a rectangular-parallelepiped shape, in which one end on one side facing the inside of the container recess 40 is formed into a curved surface curved toward a direction in which the link portion 34 extends.

The slider lock 32 is slidably inserted into a sliding recess 133 recessed outward from an inner circumferential surface of the container recess 40. At an end portion of the slider lock 32, a sloped surface 321 is formed so as to extend increasingly downward toward the end. The slider lock 32 has its lower face put into contact with the spring receiver 53 of the holding part 50. That is, the slider lock 32 restricts upward movement of the holding part 50.

The pivotal shaft 33 is a center axis serving as a pivotal center of the link portion 34. The pivotal shaft 33 may be formed integrally with the link portion 34 or formed through the link portion 34 so as to pivotably hold the link portion 34. The link portion 34 is pivotably held via the pivotal shaft 33 on the container recess 40. The link portion 34 transfers a displacement (force) resulting from a push of the push button 31 to the slider lock 32. Lower part of the link portion 34 is contactable with the push button 31. Further, upper part of the link portion 34 is connected via the pin 36 to the slider lock 32. In addition, in a case where the makeup of the link portion 34 is partly altered so that the slider lock 32 can be operated by handling of the push button 31, the push button 31 may also be provided on the upper face of an armrest part 13.

The pin 36 is attached to the slider lock 32 and extends in a direction perpendicular to both a moving direction of the holding part 50 and a sliding direction of the slider lock 32. The link portion 34 has an elongated pin hole, and the pin 36 is movably set in the pin hole. Insertion of the pin 36 into the elongated pin hole makes it possible to absorb differences in distance from the center of the pivotal shaft 33 due to sliding of the slider lock 32. As a result, as the link portion 34 is pivoted about the pivotal shaft 33, the slider lock 32 can be slid along the sliding recess 133 via the pin 36.

The torsion spring 35 is wound on the pivotal shaft 33. By the torsion spring 35, the link portion 34 is biased in such a direction that its upper part on the upper side of the pivotal shaft 33 approaches the holding part 50. Then, the link portion 34 is stopped by making contact with an end of the push button 31. As a result, the push button 31 can be maintained in a protruded state, and the slider lock 32 can be set to such a position as to restrict movement of the spring receiver 53. The chair-type massage machine 100 has a configuration described hereinabove.

The second operation unit 30 described above is only an example and not limited to this case. For example, it is allowable that the push button 31 directly operates the slider lock 32 while the link portion is omitted, or that the push button 31 itself serves also as the slider lock. Moreover, the push button 31 is not limited in its location unless incapable of operating the moving mechanism 60.

<Operations of First Operation Unit 20>

Figure 4:
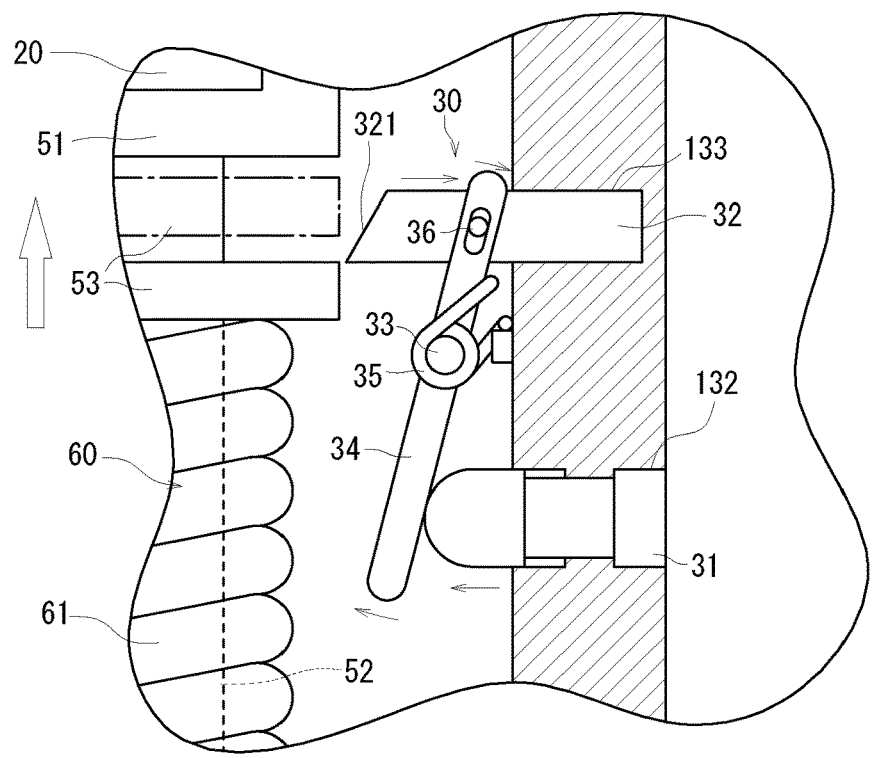
FIG. 4 is a view showing an operation of a second operation unit when a push button is pushed.
Figure 5:
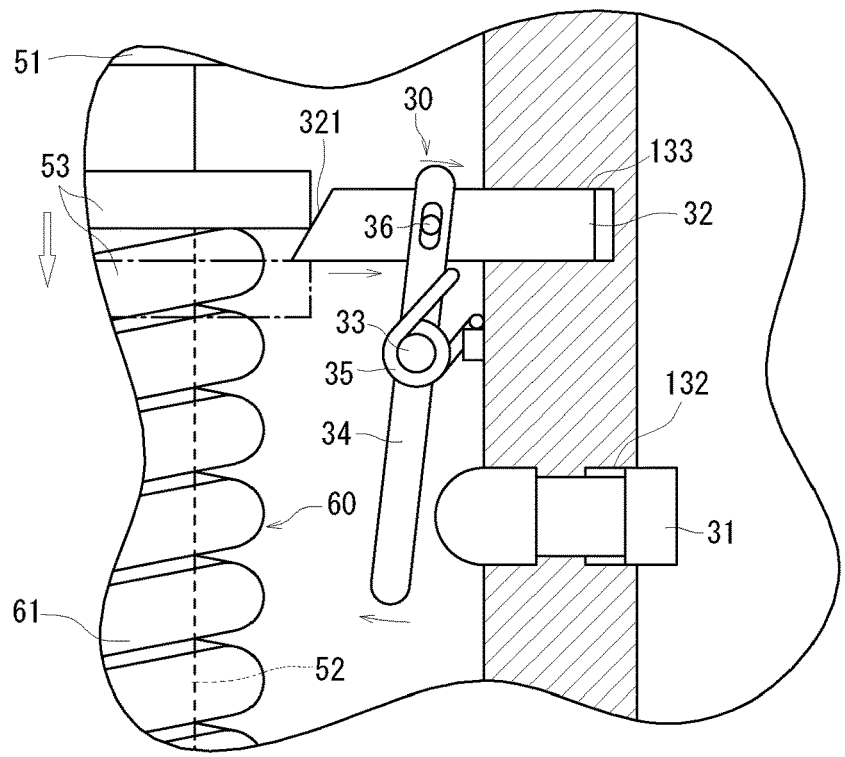
FIG. 5 is a view showing an operation of the second operation unit in setting the first operation unit into a first position.

Next, a protruding operation of the first operation unit 20 from the container recess 40 as well as its inserting operation into the container recess 40 in the chair-type massage machine 100 according to this embodiment will be described with reference to the drawings. FIG. 4 is a view showing an operation of the second operation unit 30 when the push button 31 is pushed. FIG. 5 is a view showing an operation of the second operation unit 30 when the holding part 50 is moved down so as to be contained in the first position P1.

While the holding part 50 is in the first position P1, an upper part of the link portion 34 on the upper side of the pivotal shaft 33 is pushed by the torsion spring 35 toward the center of the container recess 40. A resultant displacement (force) of the link portion 34 is transferred to the slider lock 32 via the pin 36. The slider lock 32 is moved and biased toward the center of the container recess 40. As a result, the lower face of the slider lock 32 is brought into contact with an upper face of the spring receiver 53 of the holding part 50, so that upward movement of the holding part 50 is restricted. In addition, since a direction of force acting from the spring 61 onto the holding part 50 and a movable direction of the slider lock 32 differ from each other, the slider lock 32 is less likely to be pushed into the sliding recess 133 by the force of the spring 61. Therefore, the slider lock 32 is enabled to restrict the movement of the holding part 50.

As shown in FIG. 4, when the part of the push button 31 protruded outside of the armrest part 13 is pushed by the person to be treated, the push button 31 is pushed inside of the container recess 40. Then, lower part of the link portion 34 is pushed by the push button 31, so that the link portion 34 is pivoted about the pivotal shaft 33. By this pivoting of the link portion 34, the slider lock 32 connected to the link portion 34 via the pin 36 is moved inside of the sliding recess 133.

By the slider lock 32 being moved inside of the sliding recess 133, the slider lock 32 is separated from the upper face of the spring receiver 53. As a result, the movement restriction for the holding part 50 by the slider lock 32 is released, so that the holding part 50 is moved from the first position P1 to the second position P2 by elastic force of the spring 61 in the moving mechanism 60.

The person to be treated is allowed to move the holding part 50 from the second position P2 to the first position P1 by depressing the first operation unit 20 held on the holding part 50 with a force larger than the elastic force of the spring 61.

As shown in FIG. 5, when the holding part 50 has got close to the first position P1, an edge portion of the spring receiver 53 is brought into contact with the sloped surface 321 of the slider lock 32. As the holding part 50 is moved further downward, the sloped surface 321 is pushed by the edge portion of the spring receiver 53, with the slider lock 32 moved into the sliding recess 133. Then, when the holding part 50 has reached the first position P1, the spring receiver 53 is moved to under the slider lock 32. The slider lock 32, which has been pushed by the spring receiver 53 against the sliding recess 133, is returned to the original position by the force of the torsion spring 35, overlapping with upper part of the spring receiver 53. As a result, upward movement of the holding part 50 is restricted.

As described above, in the chair-type massage machine 100 according to this embodiment, the first operation unit 20 can be contained inside the container recess 40. By the first operation unit 20 being contained in the container recess 40, the first operation unit 20 is not obstructive when the person to be treated is seated on the main body 10. Also, as the person to be treated seated on the main body 10 operates the push button 31 of the second operation unit 30, the holding part 50 is moved from the first position P1 to the second position P2. As a result of this, the first operation unit 20 is protruded upward of the upper face 131 of the armrest part 13. Thus, the person to be treated becomes ready to operate the first operation unit 20.

Also, after ending the operation of the first operation unit 20, the person to be treated is allowed to push down the first operation unit 20 or the holding part 50 holding the first operation unit 20 so that the holding part 50 can be moved to the first position P1 and moreover fixed at the first position P1. The first operation unit 20 is maintained contained inside the container recess 40. After an end of the treatment, the person to be treated sets the first operation unit 20 contained in the container recess 40, so that the first operation unit 20 is not obstructive when the person to be treated leaves the main body 10.

As described above, the person to be treated is allowed to easily take out the first operation unit 20 from the container recess 40, as required, with simplicity. Also, the first operation unit 20, when unnecessary, can be contained in the container recess 40. Thus, the first operation unit 20 is less obstructive when the person to be treated is seated on the main body 10 or leaves the main body 10. As a result of these, it is achievable to increase convenience to the person to be treated.

Second Embodiment

Figure 6:
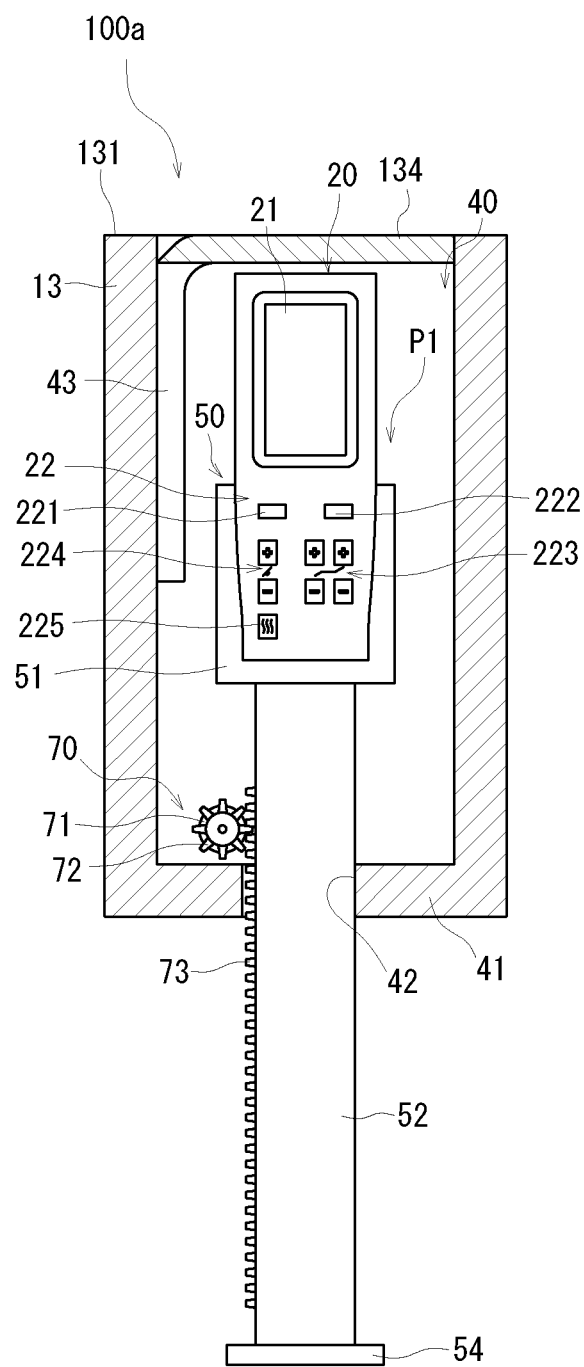
FIG. 6 is a schematic sectional view showing a state in which the first operation unit is contained in the container recess.
Figure 7:
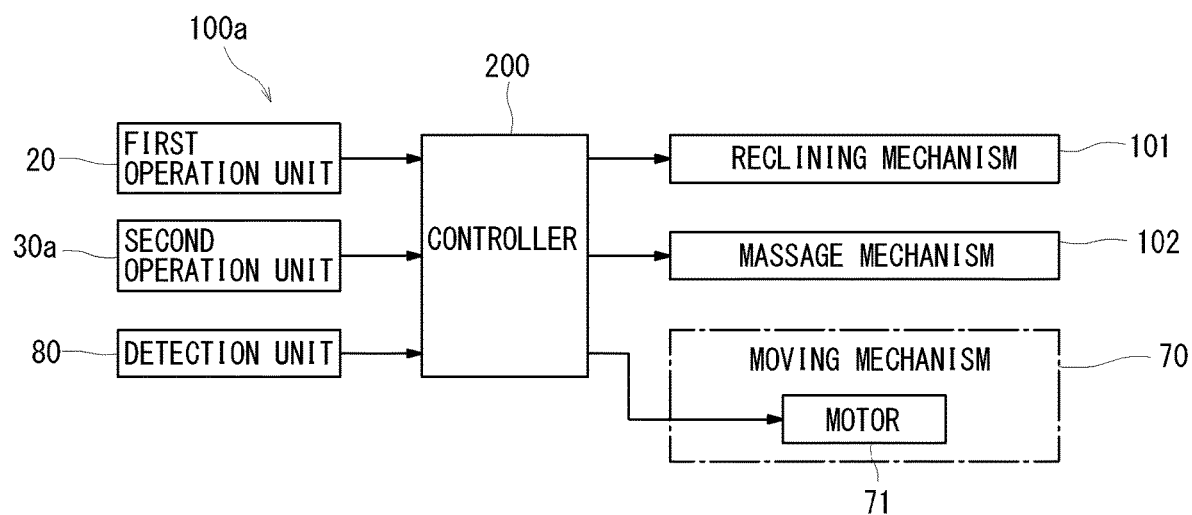
FIG. 7 is a schematic block diagram of a chair-type massage machine shown in FIG. 6.

Another embodiment of the chair-type massage machine according to the present invention will be described with reference to the drawings. FIG. 6 is a schematic sectional view showing a state in which the first operation unit 20 is contained in the container recess 40. FIG. 7 is a schematic block diagram of a chair-type massage machine 100a according to a second embodiment. The chair-type massage machine 100a of the second embodiment differs from the chair-type massage machine 100 both in that a second operation unit 30a and a moving mechanism 70 are different from those of the chair-type massage machine 100 and in that the chair-type massage machine 100a includes a lid portion 134, a rail portion 43 and a detection unit 80. A controller 200, which is omitted in the drawings in the first embodiment, is also shown in the figure. Substantially like components of the chair-type massage machine 100a in conjunction with the chair-type massage machine 100 are designated by like reference signs, and detailed description of those like components is omitted.

In the chair-type massage machine 100a, as shown in FIG. 7, all of the first operation unit 20, the second operation unit 30a, the moving mechanism 70, the detection unit 80, a reclining mechanism 101, and a moving mechanism 102 are connected to the controller 200.

The controller 200 controls operations of each of the units and mechanism of the chair-type massage machine 100a. The controller 200 includes a computer unit having an arithmetic processing circuit such as a CPU or an exclusive processor or the like. The controller 200 may be such that the circuit itself performs arithmetic operations or that control programs stored in an unshown storage unit are read and executed. The storage unit may be formed of a memory circuit, in which personal information and discrete settings and other information as to person to be treateds may be stored in addition to the foregoing control programs.

In addition, although the controller 200 is described as a member independent of the first operation unit 20 in this embodiment, yet this is not limited to. For example, the first operation unit 20 may serve also as the controller 200.

The second operation unit 30a includes a circuit enabled to deliver a signal to the controller 200 when operated. For example, the second operation unit 30a may be one which includes a pushbutton switch and which delivers a signal to the controller 200 when the pushbutton switch is pushed. The second operation unit 30a may also be other than this. The second operation unit 30a is set to such a position as to be operable for the person to be treated seated on the main body 10. In addition, the second operation unit 30a may be so designed as to serve also as the controller 200.

The reclining mechanism 101 and the massage mechanism 102 receive control signals from the controller 200 to operate according to the control signals. In addition, without being limited to this, a first operation unit 20 may transmit control signals directly.

The detection unit 80 includes a detection sensor for detecting that the person to be treated has been seated, or is seated, on the main body 10. The detection sensor may be, for example, a pressure sensor, an optical sensor, an infrared sensor, or the like. Other than these, a wide range of sensors capable of detecting the seating of the person to be treated may be adopted.

<Moving Mechanism 70>

The moving mechanism 70 will be described in detail below. As shown in FIGS. 6 and 7, the moving mechanism 70 includes a motor 71, a pinion gear 72, and a rack gear 73. The motor 71 is an electric motor, which is an example of the electric actuator. Instead of the motor, a wide range of devices capable of electrically outputting motive power may be adopted. The pinion gear 72 is fixed to an output shaft of the motor 71. The pinion gear 72 is rotated by rotation of the output shaft of the motor 71. The rack gear 73, having gear teeth arrayed in linear shape, is fitted to an outer surface of the guide pole portion 52 in the holding part 50.

The pinion gear 72 is meshed with the rack gear 73 so that the pinion gear 72 and the rack gear 73 transform rotational motion of the motor 71 into linear motion of the holding part 50. That is, rotational power of the motor 71 is transmitted via the pinion gear 72 and the rack gear 73 as power for moving the holding part 50 in an up-and-down direction. In addition, the moving mechanism 70 may include a mechanism for restricting movement of the holding part 50, such as a break mechanism. The break mechanism allows the holding part 50 to maintain in position even with power feed to the motor 71 cut off.

The chair-type massage machine 100a includes a lid portion 134 which is opened and closed by an unshown drive mechanism of the moving mechanism 70. In addition, the lid portion 134 may be opened and closed by being pushed or pulled by the holding part 50 during movement of the holding part 50. The container recess 40 has a rail portion 43 for guiding the opened lid portion 134 inside the container recess 40. The lid portion 134, after opening the container recess 40, is moved along the rail portion 43 so as to be contained inside the container recess 40. By the lid portion 134, falls of coins or other small articles into the container recess 40 can be suppressed.

<Operations of Chair-Type Massage Machine 100a>

Figure 8:
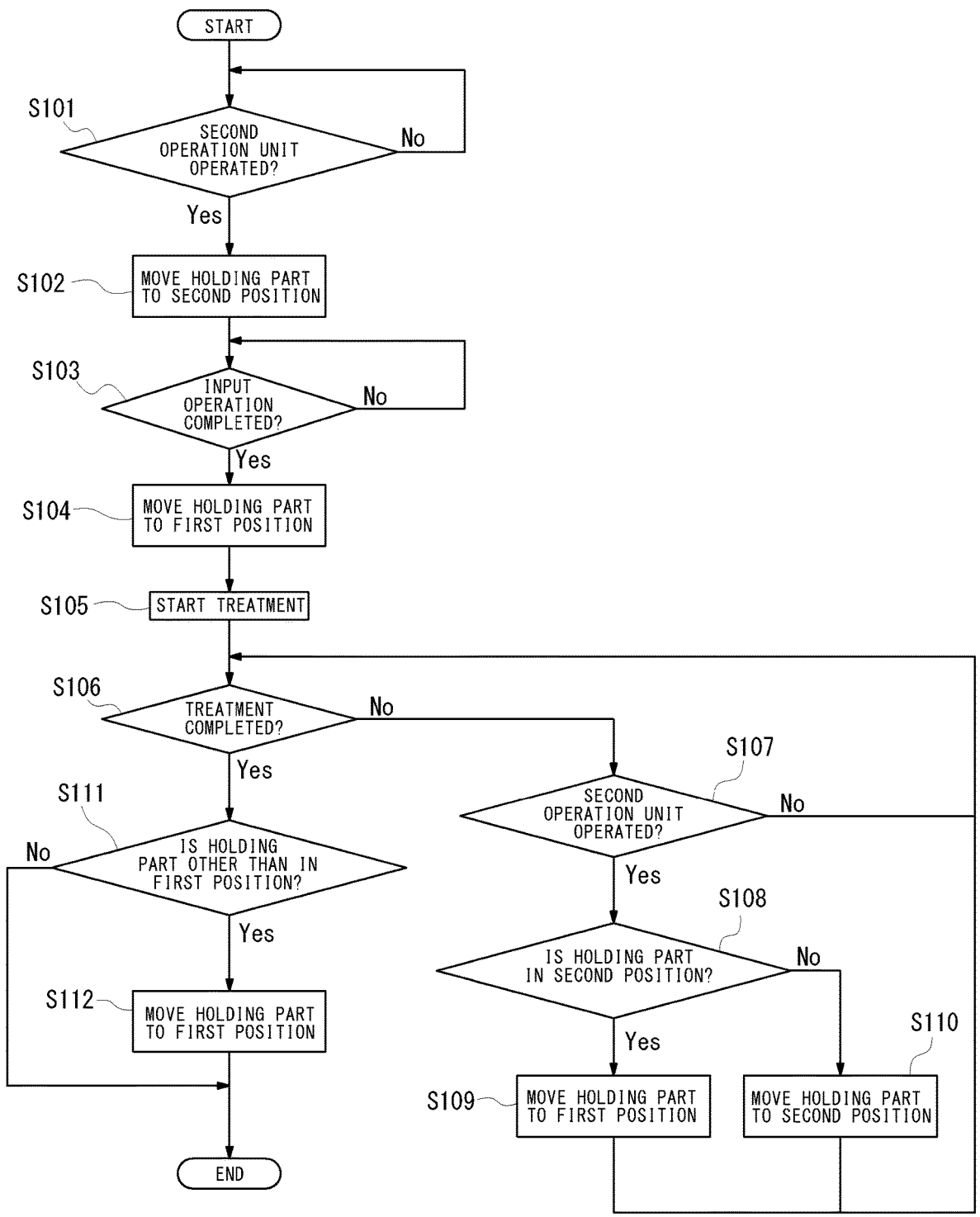
FIG. 8 is a flowchart showing operations of the chair-type massage machine.

Operations of the above-described chair-type massage machine 100a will be described with reference to the accompanying drawings. FIG. 8 is a flowchart showing operations of the chair-type massage machine 100a. It is noted that the flowchart shown in FIG. 8 shows operations in which the person to be treated handles the second operation unit 30a after the person to be treated is seated.

First, the controller 200 stands by until the second operation unit 30a is operated (step S101 is repeated until a Yes is replied at step S101). When the second operation unit 30a is operated (Yes at step S101), the controller 200 drives the motor 71 of the moving mechanism 70 to move the holding part 50 to the second position P2 (step S102). It is noted that before moving the holding part 50, the moving mechanism 70 opens the lid portion 134. While the holding part 50 is in the second position P2, the first operation unit 20 is exposed upward of the armrest part 13. In this state, the person to be treated performs an input operation on the first operation unit 20.

The controller 200 stands by until the input operation on the first operation unit 20 is completed (step S103 is repeated until a Yes is replied at step S103). The input operation on the first operation unit 20 may be one which is decided as an operation completion upon detection that a specific operation has been performed, e.g., a specific button such as a start button (not shown) or a completion button (not shown) displayed on the touch panel of the display section 21 has been operated. The input operation completion may be detected other than these.

When the input operation on the first operation unit 20 is completed (Yes at step S103), the controller 200 drives the motor 71 to move the holding part 50 to the first position P1 (step S104). After the holding part 50 is set to the first position P1, the moving mechanism 70 closes the lid portion 134. Then, the controller 200 instructs the reclining mechanism 101 and the massage mechanism 102 to start massage treatment (step S105).

The controller 200 checks whether or not the treatment has been completed (step S106). The completion of treatment may be recognized when programs set by the first operation unit 20 have been fully processed, or when a set time has elapsed, or the like, but these are not limited to.

In some cases, the person to be treated may desire to operate the reclining mechanism 101, the heater or the like even during the execution of the treatment. Therefore, the chair-type massage machine 100a is enabled to move the holding part 50 to the second position P2 during the treatment.

With the treatment incomplete (No at step S106), the controller 200 checks whether or not the second operation unit 30a has been operated (step S107). When it is not ascertained that the second operation unit 30a has been operated (No at step S107), the controller 200 repeats the checking as to completion of the treatment (returns to step S106). When it is ascertained that the second operation unit 30a has been operated (Yes at step S107), the controller 200 checks whether or not the holding part 50 is in the second position P2 (step S108).

When the holding part 50 is in the second position P2 (Yes at step S108), the controller 200 drives the motor 71 to move the holding part 50 to the first position P1 (step S109), then repeating the checking as to completion of the treatment (returns to step S106). When the holding part 50 is not in the second position P2 (No at step S108), the controller 200 drives the motor 71 to move the holding part 50 to the second position P2 (step S110), then repeating the checking as to completion of the treatment (returns to step S106).

When a completion of the treatment is ascertained (Yes at step S106), the controller 200 checks whether or not the holding part 50 is other than in the first position P1 (step S111). When the holding part 50 is other than in the first position P1 (Yes at step S111), the controller 200 drives the motor 71 to move the holding part 50 to the first position P1 (step S112), where the processing flow is ended. Meanwhile, when the holding part 50 is in the first position P1 (No at step S111), the processing flow is ended.

As described above, the person to be treated is allowed to easily take out the first operation unit 20 from the container recess 40, as required, with simple operation. Also, the first operation unit 20, when unnecessary, can be contained in the container recess 40. Thus, the first operation unit 20 is less obstructive when the person to be treated is seated on the main body 10 or leaves the main body 10. As a result of these, it is achievable to increase convenience to the person to be treated.

Moreover, even during the treatment, the person to be treated is allowed to operate the first operation unit 20 with simplicity. The second operation unit 30a is a signal-transmitting electrical device and therefore has a high degree of freedom for installation. It is also allowable to provide the second operation unit 30a in plurality.

<First Modification>

Figure 9:
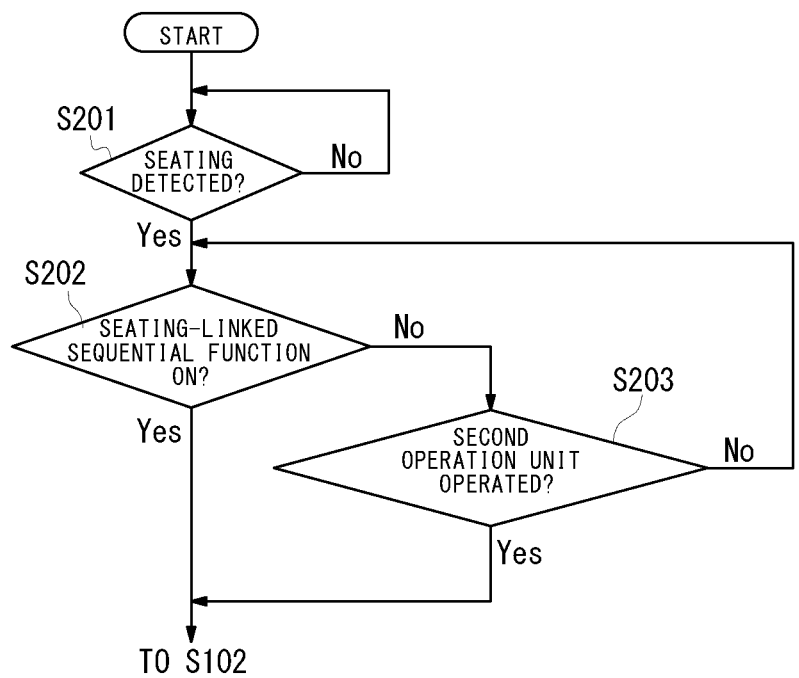
FIG. 9 is a flowchart showing operations of a seating-linked sequential function.

The chair-type massage machine 100a includes the detection unit 80. Therefore, the moving mechanism 70 is enabled to have a seating-linked sequential function of detecting a seating of the person to be treated and subsequently operating the holding part 50 in leakage by exploiting the detection unit 80. The seating-linked sequential function is explained below with reference to the drawings. FIG. 9 is a flowchart showing operations of the seating-linked sequential function. The flowchart shown in FIG. 9 is substituted for step S101 in the flowchart of FIG. 8. Only the seating-linked sequential function will be described for the explanation of the first modification.

As shown in FIG. 9, the controller 200 stands by until a seating is detected (S201 is repeated until a Yes is replied at step S201). When a seating is detected (Yes at step S201), the controller 200 checks whether or not the seating-linked sequential function is ON (step S202). When the seating-linked sequential function is not ON (No at step S202), the controller 200 checks whether or not the second operation unit 30a has been operated (step S203). When no operation of the second operation unit 30a is ascertained (No at step S203), the controller 200 returns to the checking as to whether or not the seating-linked sequential function is ON (returns to step S202).

When the seating-linked sequential function is ON (Yes at step S202) or when it is ascertained that the second operation unit 30a has been operated (Yes at step S203), the controller 200 instructs the motor 71 to move the holding part 50 to the second position P2 (step S102 in FIG. 8). Following operations are similar to those shown in FIG. 8 and so omitted.

When the person to be treated is seated, the first operation unit 20 automatically gets outside of the container recess 40 by the seating-linked sequential function. Accordingly, there is no need for operating the second operation unit 30a, making it possible to increase convenience to the person to be treated. Further, since the first operation unit 20 gets outside even with the position of the second operation unit 30a unknown, making it possible to increase convenience to the person to be treated. In addition, the person to be treated may be notified of the position of the second operation unit 30a during a first input operation to the first operation unit 20.

Although this embodiment has been described above on an example in which the seating-linked sequential function turns ON or OFF, yet the seating-linked sequential function may be set so as to be normally operating.

<Second Modification>

Figure 10:
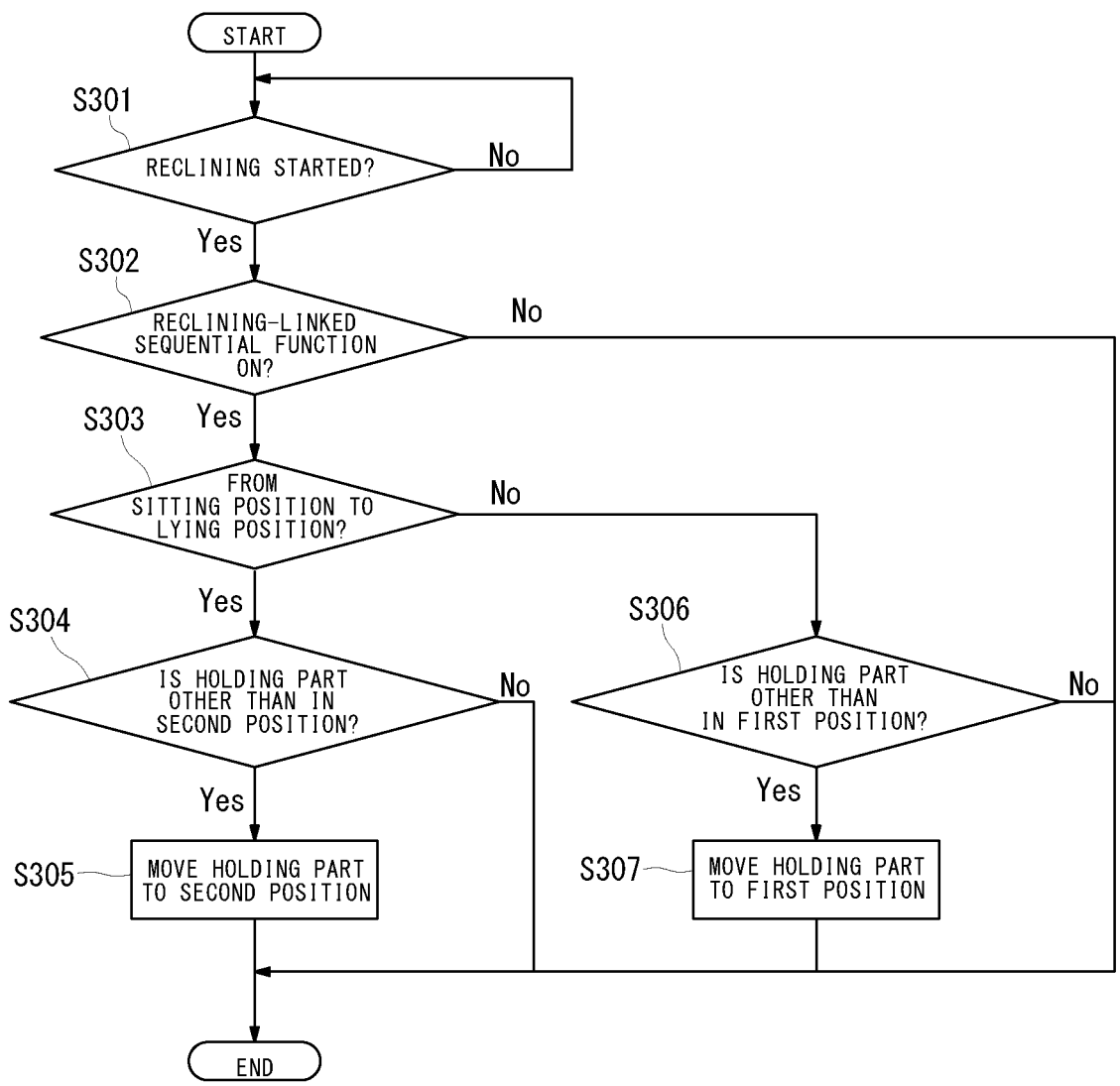
FIG. 10 is a flowchart showing a reclining-linked sequential function.

In the chair-type massage machine 100a, the moving mechanism 70 has a reclining-linked sequential function of moving the holding part 50 in linkage with the reclining mechanism 101. FIG. 10 is a flowchart showing the reclining-linked sequential function. The reclining mechanism 101 is operable independently of operation of the massage mechanism 102. That is, the reclining-linked sequential function is an interrupt operation which is executable to some degree of freedom during operations of the chair-type massage machine 100a.

As shown in FIG. 10, the controller 200 stands by until an operation start of the reclining mechanism 101 is ascertained (step S301 is repeated until a Yes is replied at step S301).

When an operation start of the reclining mechanism 101 is ascertained (Yes at step S301), the controller 200 checks whether or not the reclining-linked sequential function is ON (step S302). When the reclining-linked sequential function is not ON (No at step S302), the processing flow is ended.

When the reclining-linked sequential function is ON (Yes at step S302), the controller 200 checks whether or not a motion of the reclining mechanism 101 is a transition from a sitting position to a lying position (step S303). When the motion of the reclining mechanism 101 is one from the sitting position to the lying position (Yes at step S303), the controller 200 checks whether or not the holding part 50 is other than in the second position P2 (step S304).

When the holding part 50 is other than in the second position P2 (Yes at step S304), the controller 200 instructs the motor 71 to operate so as to make the holding part 50 moved to the second position P2 (step S305), then ending the processing flow. When the holding part 50 is in the second position P2 (No at step S304), the processing flow is ended.

When the motion of the reclining mechanism 101 is a transition from the lying position to the sitting position (No at step S303), the controller 200 checks whether or not the holding part 50 is other than in the first position P1 (step S306).

When the holding part 50 is other than in the first position P1 (Yes at step S306), the controller 200 instructs the motor 71 to operate so as to make the holding part 50 moved to the first position P1 (step S307), then ending the processing flow. When the holding part 50 is in the first position P1 (No at step S306), the processing flow is ended.

As described above, the moving mechanism 70 operates the holding part 50 in linkage with the motion of the reclining mechanism 101 in order that the first operation unit 20 is drawn out or contained in. As a result, it becomes possible to increase convenience to the person to be treated. Although the reclining-linked sequential function is turned ON or OFF in the chair-type massage machine 100a of this modification, yet this is not limited to, and the reclining-linked sequential function may be set so as to be normally functioning.

For example, the person to be treated leaves the state of the sitting position to outside of the main body 10. Therefore, while the person to be treated is in the sitting position, the first operation unit 20 is more likely to be obstructive. For this reason, the first operation unit 20 is contained in the container recess 40 while the person to be treated is in the sitting position. Meanwhile, the person to be treated seldom leaves the state of the lying position to outside of the main body 10. In some cases, the person to be treated may desire to make an input operation for changing the posture or prolonging the treatment or the like. Accordingly, while the person to be treated is in the lying position, the chair-type massage machine 100a sets the first operation unit 20 exposed outside. This operation, in the chair-type massage machine 100a, is automatically implementable by the reclining-linked sequential function. As a result, this can increase convenience to the person to be treated.

In addition, for example, the reclining-linked sequential function may be linked with reclining operations subsequent to the treatment start (step S105) in the flowchart of FIG. 8. The first operation unit 20 can be automatically drawn outside in linkage with the motion of the reclining mechanism 101 even when the person to be treated has operated the reclining mechanism 101 alone on the way of treatment.

<Third Modification>

Figure 11:
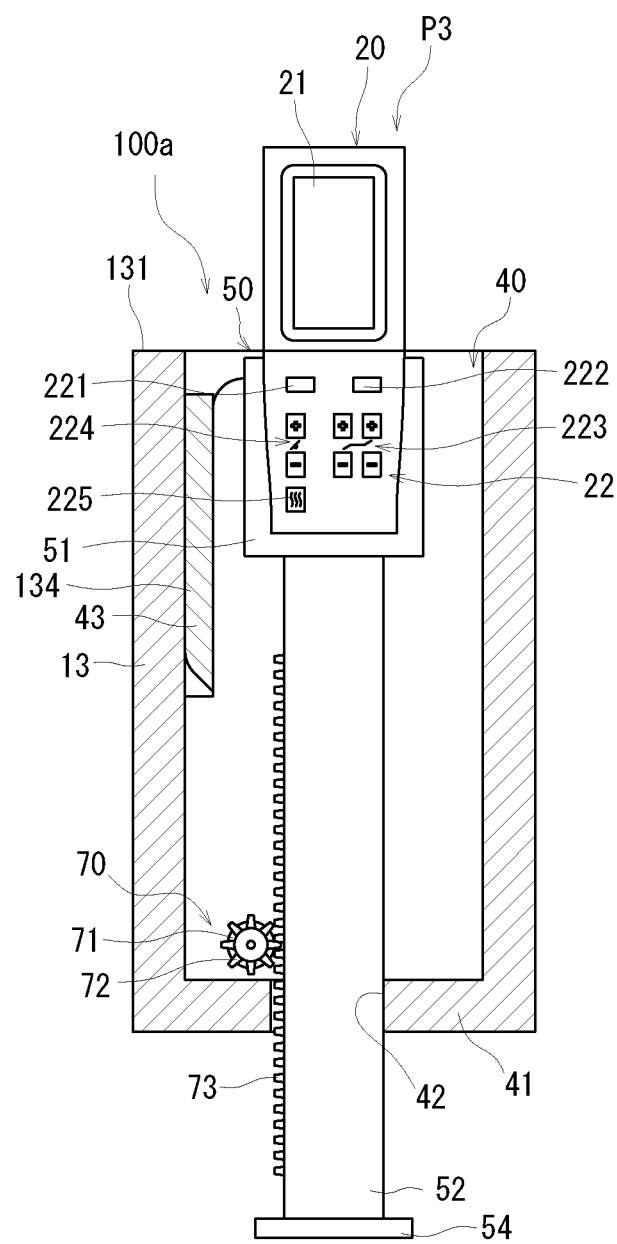
FIG. 11 is a view showing the first operation unit set in a third position.

FIG. 11 is a view showing the first operation unit 20 positioned in a third position P3. With the chair-type massage machine 100a, the person to be treated, while in the lying position, may desire to check only images displayed on the display section 21 of the first operation unit 20. The images may include motion images, still images and the like. Also, the images may include a changeover key for changing over playing operation involved in playing music as an example. Like this, a desirable state may be that only at least part of the display section 21 is exposed outside of the container recess 40.

Accordingly, as shown in FIG. 11, the controller 200 may control the motor 71 so that the holding part 50 can be stopped at a third position P3 between the first position P1 and the second position P2. For example, the holding part 50 may be stopped at a predetermined third position P3 while being moved between the first position P1 and the second position P2. Further, the holding part 50 may also be stopped upon acceptance of an operation input from the person to be treated to the second operation unit 30a. In this case, the person to be treated may be enabled to stop the holding part 50 at a third position P3 that is an arbitrary site designated by the person to be treated.

In each of above described embodiment, it is assumed that the container recess 40 is placed in the upper face of an armrest part 13, yet this is not limited to. The placement site of the container recess 40 may be selected from a wide range of positions, such as a frontage of a lateral portion of the backrest part 12, that allow the person to be treated to easily operate the first operation unit 20.

The present invention is applicable to chair-type massage machines for kneading and relaxing the body of a person to be treated.

While the foregoing has described the embodiment of the present invention, the present invention is not limited thereto. Furthermore, the embodiment of the present invention can be implemented by adding various modifications thereto without departing from the spirit of the invention.

In order to achieve the above object, the present invention provides a chair-type massage machine 100 (100a) including: a main body 10 on which a person to be treated is to be seated; a first operation unit 20 for accepting an input operation made by the person to be treated; a container recess 40 formed in the main body 10 and capable of containing the first operation unit 20; a holding part 50 at least part of which is placed inside the container recess 40 to hold the first operation unit 20; and a moving mechanism 60 (70) for moving the holding part 50. The holding part 50 is reciprocatably movable between a first position P1 in which at least part of the first operation unit 20 is contained inside the container recess 40 and a second position P2 in which the first operation unit 20 is exposed out of the container recess 40 at a ratio larger than that of the first position P1. The chair-type massage machine 100 (100a) further includes a second operation unit 30 (30a) which is placed on the main body 10 and which, based on an operation by the person to be treated, instructs the moving mechanism 60 (70) to execute movement of the holding part 50.

In the above-described chair-type massage machine 100, the moving mechanism 60 includes a biasing part 61 placed in the container recess 40 to bias the holding part 50 in a direction directed from the first position P1 toward the second position P2. The second operation unit 30 includes a lock part 32 placed in the container recess 40 to restrict movement of the holding part 50 set in the first position P1. When the second operation unit 30 is operated, the lock part 32 may derestrict movement of the holding part 50.

In the above-described chair-type massage machine 100, the moving mechanism 70 may include an electric actuator 71 enabled to reciprocatably move the holding part 50 between the first position P1 and the second position P2; and when the second operation unit 30a is operated, the moving mechanism 70 may either move the holding part 50, which is in the first position P1, to the second position P2, or move the holding part 50, which is in the second position P2, to the first position P1.

The above-described chair-type massage machine 100 may further include a detection unit 80 for detecting a seating of the person to be treated, wherein the moving mechanism 70 may move the holding part 50 to the second position P2 when the detection unit 80 detects a seating of the person to be treated.

In the above-described chair-type massage machine 100, the main body 10 with the person to be treated seated thereon may be changeable between a sitting position in which an upper-half body of the person to be treated is raised up and a lying position in which the upper-half body of the person to be treated is tilted backward, and the moving mechanism 70 may move the holding part 50 toward the second position P2 for a transition of the main body 10 from the sitting position to the lying position, and move the holding part 50 toward the first position P1 for a transition of the main body 10 to the sitting position.

In the above-described chair-type massage machine 100, the moving mechanism 70 may stop the holding part 50 at a third position P3 which is an intermediate position between the first position P1 and the second position P2.

In the above-described chair-type massage machine 100 (100a), the main body 100 may include: an armrest part 13 which is placed beside a seat part 11 for holding a waist of the person to be treated and which is enabled to hold a forearm of the person to be treated, and a backrest part 12 for holding an upper-half body of the person to be treated, wherein the container recess 40 may be formed either in an upper face 131 of the armrest part 13 or in a front face of a lateral portion of the backrest part 12.

What is claimed is:

1. A chair-type massage machine comprising:
   a main body on which a person to be treated is to be seated;
   a first operation unit for accepting an input operation made by the person to be treated;
   a container recess formed in the main body and capable of containing the first operation unit;
   a holding part at least part of which is placed inside the container recess to hold the first operation unit;
   a moving mechanism for moving the holding part; and
   a second operation unit which is placed on the main body and which, based on an operation by the person to be treated, instructs the moving mechanism to execute movement of the holding part, wherein
   the holding part is reciprocally movable by the moving mechanism between a first position in which at least part of the first operation unit is contained inside the container recess and a second position in which the first operation unit is exposed out of the container recess at a ratio larger than that of the first position;
   the moving mechanism includes an electric actuator enabled to reciprocally move the holding part between the first position and the second position, and
   when the second operation unit is operated, the moving mechanism either moves the holding part, which is in the first position, to the second position, or moves the holding part, which is in the second position, to the first position.

2. The chair-type massage machine according to claim 1, further comprising
 a detection unit for detecting a seating of the person to be treated, wherein
 the moving mechanism is enabled to move the holding part to the second position when the detection unit detects a seating of the person to be treated.

3. The chair-type massage machine according to claim 1, wherein
 the main body with the person to be treated seated thereon is changeable between a sitting position in which an upper-half body of the person to be treated is raised up and a lying position in which the upper-half body of the person to be treated is tilted backward, and
 the moving mechanism is enabled to move the holding part toward the second position for a transition of the main body from the sitting position to the lying position, and to move the holding part toward the first position for a transition of the main body to the sitting position.

4. The chair-type massage machine according to claim 1, wherein
 the moving mechanism stops the holding part at a third position which is an intermediate position between the first position and the second position.

5. The chair-type massage machine according to claim 1, wherein
 the main body includes:
 an armrest part which is placed beside a seat part for holding buttocks and thighs of the person to be treated and which is enabled to hold a forearm of the person to be treated, and
 a backrest part for holding an upper-half body of the person to be treated,
 wherein the container recess is formed either in an upper face of the armrest part or in a front face of a lateral portion of the backrest part.

\* \* \* \* \*